United States Patent [19]
Huffman

[11] 3,793,918
[45] Feb. 26, 1974

[54] CROSS PERFORATING BLADE LOCK

[76] Inventor: Harold W. Huffman, 2100 John Gary Rd., Fairfield, Ohio 45011

[22] Filed: Oct. 12, 1971

[21] Appl. No.: 188,080

[52] U.S. Cl.................. 83/698, 74/89.15, 83/699, 269/267
[51] Int. Cl............................................. B26d 1/12
[58] Field of Search ............ 83/698, 699, 674, 665; 269/265, 267, 272; 74/89.15

[56] References Cited
UNITED STATES PATENTS
| | | | |
|---|---|---|---|
| 3,527,123 | 9/1970 | Dovey................................ | 83/698 X |
| 2,722,867 | 11/1955 | Dackor et al.................... | 269/267 X |
| 3,587,335 | 6/1971 | Howland............................ | 74/89.15 |

*Primary Examiner*—Andrew R. Juhasz
*Assistant Examiner*—W. Donald Bray
*Attorney, Agent, or Firm*—J. Warren Kinney, Jr.

[57] ABSTRACT

The perforating or cutting blade of the blade cylinder of a press, collator, or similar machine, is locked in a blade channel by means of a multiplicity of clamp members in the form of floating rollers which, by means of a single clamp actuator, are caused to impinge at a plurality of locations along the length of the blade for quickly, accurately, and uniformly clamping the blade in locked, operative position within the blade channel.

38 Claims, 10 Drawing Figures

PATENTED FEB 26 1974 3,793,918

INVENTOR
HAROLD W. HUFFMAN

BY J. Warren Kinney Jr.
ATTORNEY

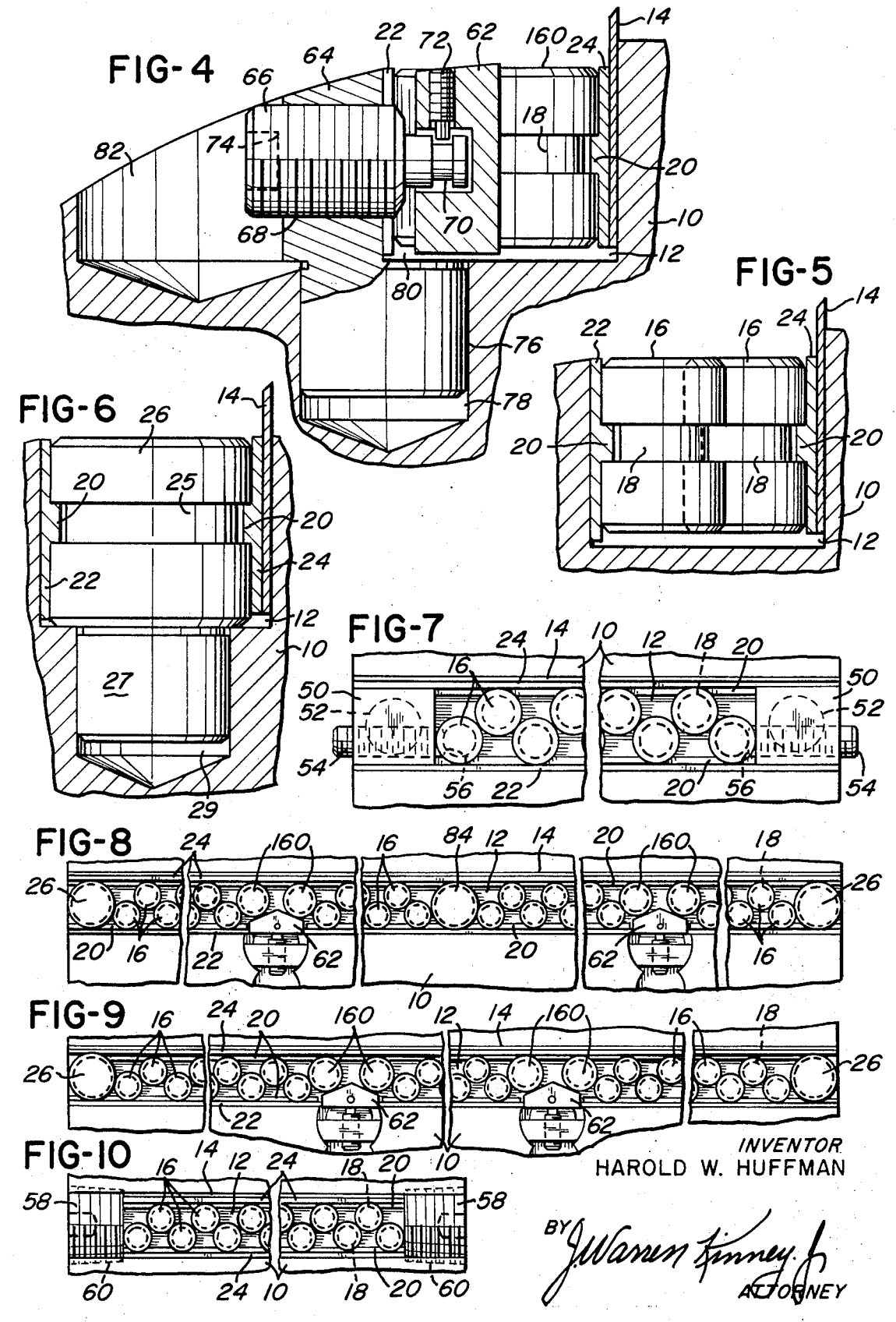

CROSS PERFORATING BLADE LOCK

BACKGROUND OF THE INVENTION

The field of the invention pertains to blade cylinders of a press, collator, or other processing equipment or machine for cutting, perforating or otherwise operating upon webs of paper or other material moving at high speed about web supporting cylinders of the machine.

The prior art involves principally the use of press cylinders channeled from end to end, at the cylindrical surface thereof, to accommodate one or more elongate blades having cutting, scoring, or perforating knife edges which project outwardly of the cylinder periphery. In the past, blades lodged within the channel were held therein by means of a multiplicity of clamp screws each individually adjustable for impingement against the blade. Considerable skill and sometimes excessive expenditure of set-up time were required in leveling the blade and keeping it level while at the same time manipulating a multiplicity of screws for clamping the blade in position.

In effect, the setting up and replacement of blades were tedious time-consuming operations wasteful of time and labor, and often lacking accuracy and/or uniformity of pressure settings. The foregoing faults and inaccuracies, among others, are effectively eliminated by means of the present invention.

SUMMARY OF THE INVENTION

The blade cylinder is slotted or channeled lengthwise upon its surface, to a depth necessary for accommodating a blade. Within the channel is disposed a multiplicity of rollers arranged in two rows, with the rollers of one row staggered between the rollers of the second row, and in line contact with one another. The rollers when in idle or non-clamping condition, are loose and shiftable to a limited extent, but will not fall from the channel due to the presence of retaining means within the channel.

At opposite ends of the channel, fixed abutments or stops are provided for limiting movement of the rollers outwardly lengthwise of the channel. At one or more locations intermediate the stops or abutments there is provided a floating wedge structure or expander device, which by means of a single actuator, cramps the rollers between the end stops, against one other, and upon a side face of the blade and the channel, for applying at numerous locations and with great uniformity of pressure, a forceful clamping or camming action which at once securely though releasably fixed the blade within the channel. Trial and error in setting the blade need not be resorted to, and accurate pressure setting is attained with ease and dispatch.

It is noteworthy in connection with the present invention, that the improved blade lock is so designed that it may be installed upon existing blade cylinders, without removing the cylinders from the machine or transporting them to a remote service shop.

BRIEF DESCRIPTION OF THE DRAWING

FIG. 4 is an enlarged cross-section on line 4—4 of FIG. 3.

FIG. 5 is an enlarged cross-section on line 5—5 of FIG. 3.

FIG. 6 is an enlarged cross-section on line 6—6 of FIG. 3.

FIG. 7 is a fragmentary top plan view showing a modification of FIG. 2.

FIG. 8 is a plan view similar to FIG. 2, showing a second modification, the blade being unlocked.

FIG. 9 is a view of the FIG. 8 structure showing the blade in locked or operative position.

FIG. 10 is a fragmentary top plan view showing a modification of the FIG. 7 structure.

DESCRIPTION OF THE PREFERRED EMBODIMENT

Figure 1:
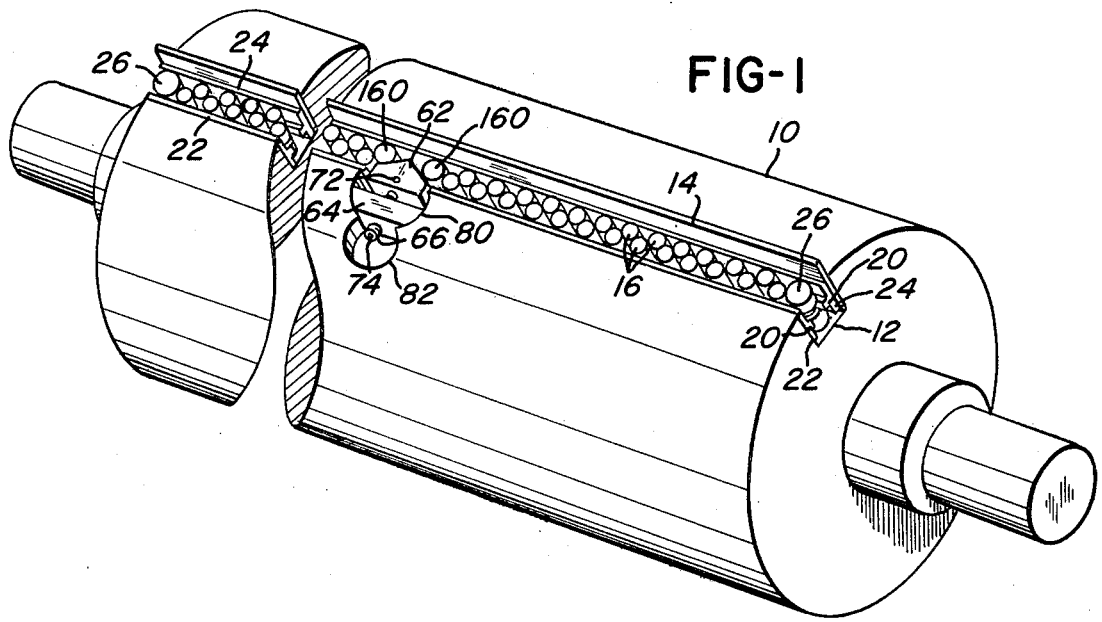
FIG. 1 is a perspective view of the blade cylinder of a press incorporating the blade lock means of the present invention.

In the drawing, a blade cylinder, or the like employed in machinery for processing paper or other web-like material, is denoted by the numeral 10. A channel 12 is formed in the peripheral surface of the cylinder, said channel being of uniform width and depth, and extending preferably from one end to the other of the cylinder. The channel is adapted to accommodate a blade 14, the mean plane of which is approximately radial to the cylinder axis. The channel is usually parallel to the cylinder axis, and its width is considerably greater than the blade thickness.

The cutting edge of the blade may be continuous or serrated, as desired, depending upon the type of service the blade is to perform.

The reference characters 16 indicate a number of short rollers of equal length each of which is approximately as long as the depth of channel 12, and formed of hardened metal suitable for the use herein disclosed. Each roller, sometimes referred to herein as a cam or clamp member, is provided with a circumferential groove 18 located approximately midway between its opposite ends.

The grooves 18 of rollers 16 constitute means for precluding their accidental or inadvertent displacement radially from channel 12, since the grooves are adapted to receive and engage the longitudinal ribs 20 of retainer strips 22 and 24 the lower or inner ends of which rest upon the bottom wall of channel 12. One retainer strip 22 is backed against a side wall of channel 12, whereas the other retainer strip 24 backs against one face of blade 14.

The rollers 16 are arranged in two rows, one row being in contact with a hardened retainer strip 22, and the other row being in contact with hardened retainer strip 24. The peripheries of the rollers of one row are disposed between the peripheries of the rollers of the other row, to a limited extent such that the rollers of one row are staggered with respect to those of the other row. When the rollers of one row are operative to clamp against the blade 14, they are also in firm line contact with the peripheries of the second row of rollers, as in FIG. 3. In the inoperative, relaxed or unlocked condition of the rollers (FIG. 2), contact between the rollers of the two rows is very light.

It will be proper and convenient to refer to one row of rollers as the blade clamp rollers or elements, (those which contact the blade 14), the remaining row of rollers being considered back-up rollers or elements, or those which abut the back retainer strip 22. Strip 24 is arranged to shift slightly toward and from blade 14, incident to clamping and releasing of the blade.

At opposite ends of channel 12 are located fixed stops or abutments 26, 26, FIG. 1, which function to limit displacement of the rollers 16 lengthwise of channel 12. According to FIGS. 1 through 6, members 26 are in the form of non-rotatable metal dowels each having formed at its lower end a reduced-diameter stud 27 (FIG. 6), which is snugly fitted or driven into a hole 29 drilled radially into the metal of the blade cylinder, holes 29 being located near the ends of channel 12. The abutments 26 are grooved annularly as at 25, to accommodate the ribs 20 of retainers 22 and 24.

In the FIG. 7 modification, the end stops or abutments corresponding to those at 26, are in the form of rectangular blocks 50, 50 which span the width of channel 12. The blocks are provided with studs 52 adapted to seat in holes drilled near the ends of the channels, as explained above. Moreover, the abutment blocks are grooved at opposite side faces to accommodate the ribs 20 of the retainers 22 and 24.

With further reference to FIG. 7, one or both of the abutment blocks 50, 50 is drilled and tapped to receive a clamp screw 54, the inner end 56 of which will be advanced against the endmost one of the rollers 16 by rotating said screw.

The outer end of one or both screws 54 is accessible at an end face of roll 10, and is adapted to receive a suitable wrench or turning tool, not shown, whereby an advancement of the screw inwardly against a roller 16 compacts or cramps the rollers within the channel to increase the offset relationship thereof. This of course imposes a lateral force against the retainer strips 22, 24, causing the floating retainer strip 22 to move the blade 14 flatwise against a side wall of channel 12 with considerable force, thereby to fix the blade with a pressure setting which is uniform along the full length of the blade.

The clamping screw or screws 54 may be offset relative to stud 52 as shown in FIG. 7, so that the inner end of the screw may squarely abut the adjacent or endmost roller 16. It should be understood that a single clamping screw 54 at one end only of channel 12, may be provided if desired. The retainer elements 22, 24 and the rollers 16 are formed of hard durable metal.

The FIG. 10 modification substitutes for the blocks of FIG. 7, screw-threaded plugs 58, 58. The plugs threadedly engage screw threads 60 formed in the opposite ends of channel 12, and may be advanced against the endmost of rollers 16 to increase their offset in substantially the manner of FIG. 7, to produce a clamping force laterally against blade 14. If desired, the structure may employ either one or two plugs such as 58 acting as a clamping screw.

Figure 2:
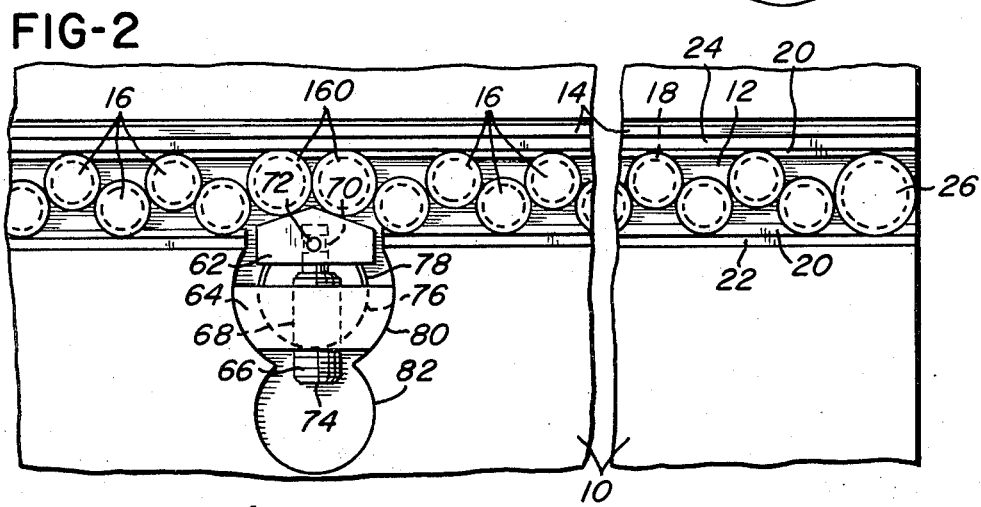
FIG. 2 is a fragmentary top plan view of FIG. 1, showing the blade lock means in an inoperative or unlocked condition.
Figure 3:
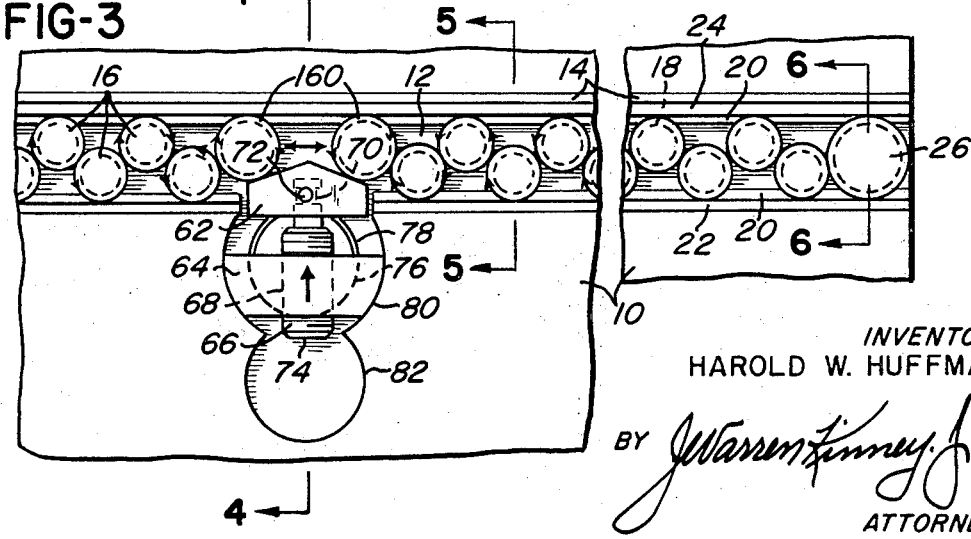
FIG. 3 is a view similar to FIG. 2, showing the blade lock means in operative or locked condition.

A preferred clamping means is illustrated by FIGS. 1 through 6, wherein at 62 is indicated a double-faced cam or floating wedge disposed for advancement and retraction transversely within channel 12, and adapted to floatingly impinge against, enter between, and displace in opposite directions, two of the adjacent rollers 160, note FIGS. 2 and 3. The rollers 160 which are in contact with cam or wedge 62, may be referred to as drive rollers, and may be slightly larger in diameter than rollers 16.

The cam or wedge 62 enters channel 12 from one side thereof, and is shiftably mounted upon a carrier member 64 which in turn is fixedly secured to the blade cylinder 10. An actuator for advancing and retracting the cam or wedge comprises a clamping screw 66 in threaded engagement with a transverse internally threaded bore 68 of the carrier member. Screw 66 has an inner end annularly grooved at 70, to loosely accommodate the inner end of a pilot or screw 72 which is mounted upon the carrier member and arranged to enforce movement of the cam or wedge 62 in correspondency with axial shifting movements of the clamp screw or actuator 66. The element 66 is adapted to be rotated by means of a wrench or tool, not illustrated, applied at the outer exposed end 74 thereof.

It may be noted that carrier member 64 has formed thereon a depending cylindrical post or mounting stud 76, which is snugly fitted or pressed into a cylindrical bore 78 drilled in the material of blade cylinder 10 approximately radially of its axis. An enlarged counterbore 80 of bore 78 accommodates the main body portion of carrier member 64, so as to support the carrier member in a position at which no part thereof extends outwardly of the periphery of roll 10.

A third substantially radial bore 82 which intersects counterbore 80, provides a depression in the face of the blade cylinder to facilitate application of a wrench to the exposed head of actuator or screw 66.

It should be noted that the bores 78, 80 and 82 are holes that very easily may be drilled into the blade cylinder without removing it from its supporting bearings. The construction accordingly permits application of the improved blade lock to existing blade cylinders at minimal expense, and without taking the machine out of service for an extended period of time. This is a primary advantage and an objective of the present invention.

In the inoperative or unclamped condition of blade 14 (See FIG. 2), the wedge or cam is retracted by means of actuator 66, so that the cam faces of the wedge impose no force upon the slightly enlarged drive rollers 160. As a consequence thereof, all of the remaining rollers 16 will be loosely embraced within the blade channel, thereby permitting free bodily removal or replacement of blade 14.

To lock the blade 14 within the channel (FIG. 3) a suitable tool is applied for advancing the actuator or screw 66 and its associated wedge 62, causing the wedge to advance between and displace outwardly in opposite directions the drive rollers 160, 160 which overlie the inclined faces of the wedge. By reason of the drive cylinder displacement, each of the remaining rollers 16 are simultaneously rotated relative to one another incident to being cramped against one another, with a resultant increase of offset occurring between the longitudinal rows of rollers occupying channel 12. As offsetting progresses under the continued advancement of screw 66, that row of rollers which impinge against retainer 22 will drive the retainer flatwise aainst blade 14, to lock the blade in operative position against the adjacent side wall of channel 12. The blade remains so locked until such time as an attendant retracts the screw 66.

It is to be noted that the groove and pin connection at 70, 72, enforces a positive retraction as well as a positive advancement, of the wedge or cam 62 relative to the enlarged drive cylinders 160. By providing for a positive retraction of the wedge or cam, all of the rollers are assured a maximal freedom of movement to the relaxed or unclamped status incident to retraction of screw 66, so that blade 14 may easily be removed or replaced.

Attention is directed to the fact that advancement of the wedge or cam 62 against the adjacent cylinders 160, 160, results in rotation of the several rollers 16 with a substantially frictionless rolling action. This ensures ease of operation of the clamp means, and enhances dependability of the clamping and unclamping functions. If considered desirable or necessary, a lock nut may be applied to actuator screw 66.

With particular reference now to FIGS. 2 and 3 it should be understood that the rollers on each side of floating wedge 62 are subjected to equal forces or pressure, since said wedge is articulated in such a manner as to enable it to float or tip whereby to insure that its respective inclined faces will be free to squarely engage both of drive rollers 160.

In the event that wedge 62 could not float, that is, if it were guided or restricted to linear motion only the pressures imparted to the drive rollers 160 could be unequal, in which event the desired locking action of rollers 16 would be seriously impaired.

With further reference to FIGS. 2 and 3, it should be noted that sliding friction occurs only between the inclined faces of floating wedge 62 and drive rollers 160, and that a substantially frictionless rolling action, as indicated by the arrow heads in FIG. 3, occurs between drive rollers 160 and hardened strip 24, between drive rollers 160 and rollers 16, between rollers 16 and each of hardened strips 22 and 24, and between all adjacent rollers 16; such substantially frictionless or free rolling action produces substantially equal pressure along the entire length of the blade.

It is necessary that all of the rollers, strips 22 and 24 and the inclined faces of the floating wedge 62 be hardened to such an extent as to positively preclude any distortion of their respective surfaces when subjected to the pressures required or induced for locking the blade relative to the blade cylinder.

The angle of those inclined surfaces of the floating wedge which engage drive rollers 160 are not less than 10° relative to the axis of the row of rollers in which drive rollers 160 are located so as to prevent self-locking, that is, to insure that rollers 160 and 16 will automatically return or release when the wedge is backed off, as in FIG. 2. The ideal situation is to provide maximum movement sidewise (toward strips 22 and 24) for a minimum adjustment of screw 66. Whereas the aforesaid angle should not be less than 10° it could in certain instances approach 45° when maximum sidewise movement of the rollers with minimum movement of adjusting screw 66 is not paramount.

In the modification, FIG. 8, the blade cylinder 10 embodies two of the aforesaid clamp means including wedge or cam members such as 62 just described. In this instance, fixed end stops or abutments such as 26 are located within channel 12 at opposite ends thereof, and a third such fixed stop or abutment 84 is located about midway between the channel ends. Thusly arranged, the two individual clamp means at opposite sides of the central stop or abutment 84, may serve to clamp or lock either a single long blade 14, or two or more shorter blades disposed in axial alignment within the channel.

In the FIG. 9 modification, a plurality of clamp means 62 is embodied in the machine roll in substantially the manner of FIG. 8, but with the intermediate stop or abutment 84 of FIG. 8 omitted. In the case of FIG. 9, quite obviously, the forces imposed by the separate clamp devices will reinforce one another, and an even distribution of locking force upon blade 14 is obtained along the full length of the blade.

It should be appreciated from the foregoing explanation, that all rollers of the blade clamp row will act with equalized force along the length of the blade, to effect great uniformity of blade fixation pressure, the clamping forces acting not only uniformly but simultaneously as well, along the length of the blade, to fix it within channel 12.

From the foregoing, it should readily be understood that the blade lock means of the present invention imposes a uniform locking force by camming action at uniform intervals along the full length of a roll blade, initiated by the simple manipulation of a single clamp actuator, with great savings of time, labor, and expense, and with accuracy of blade adjustment assured. The rollers 16, and 160 quite properly may be regarded as cams or camming elements operative upon a blade to lock it relative to the machine roll.

In use, a machine operator, having inserted a blade 14 in channel 12 as illustrated in the drawings, but with the cutting edge thereof projecting somewhat beyond a kissing-contact relation with an anvil roll (not shown), will impose a light clamping action on the blade relative to the blade cylinder by advancing the actuator screw by an amount short of effecting a firm fixation thereof. Thereafter, blade cylinder is rotated for disposing the outer, cutting edge of the blade in contact with the outer surface of the anvil roll, throughout the entire length of the blade. This step will cause the blade to be shifted away from the anvil roll and somewhat deeper into its supporting channel, whereby to accurately determine the precise relative position of the outer cutting edge of the blade with respect to the blade cylinder periphery in order to produce an effective cutting or perforating action when the blade cylinder is operated in conjunction with a conventional anvil roll.

The operator, having thus precisely and accurately determined the desired relationship between the outer cutting edge of the blade and the periphery of the anvil roll, need only to tighten the actuator screw for further enforcing a maximum lateral displacement of the rollers of each of the two rows for securely and positively locking the blade to the blade roll at a plurality of spaced intervals, as determined by each line of contact with the cylinders in that row which impose clamping force upon the blade, through the intermediary of the adjacent retainer strip.

What is claimed is:

1. In combination, an elongate blade cylinder, an elongate blade detachably mountable upon said cylinder lengthwise of its axis, and a blade clamp means including a single clamp actuator, for releasably clamping the blade relative to the cylinder with uniformity of clamping pressure at a multiplicity of locations along the length of the blade, said clamp actuator including a single clamp screw located upon the cylinder intermediate the ends thereof.

2. The combination as defined by claim 1, wherein the blade clamp means includes a multiplicity of contacting parallel rollers arranged with their axes approximately normal to the blade cylinder axis, and wherein said clamp actuator acts upon at least one of said rollers for rotating and thereby shifting all of said rollers in applying a clamping force upon the blade and against said cylinder.

3. The combination as defined by claim 2, wherein rotation and shifting of said rollers both longitudinally and transversely of the blade axis, is initiated by said single clamp actuator.

4. The combination as defined by claim 2, wherein is included means for normally retaining the rollers against displacement from the blade cylinder.

5. The combination of an elongate axially rotatable blade cylinder for detachably supporting an elongate substantially flat blade approximately lengthwise thereof, said cylinder having an elongate channel formed in the periphery thereof between opposite ends thereof, said channel having a bottom wall, one side wall having a blade abutment area, and a second side wall in spaced substantial parallelism with said one side wall; a multiplicity of rollers disposed within said channel with their axes normal to the axis of the blade cylinder, said rollers being arranged in two parallel rows, with the rollers of one row located between, offset from, and in line contact with the rollers of the second row; stop means for limiting the extent to which the rollers may move outwardly toward the opposite ends of the said channel; and actuator means for applying force to an endmost roller of a row in a direction lengthwise of the channel axis, for cramping the rollers of one row against the rollers of the second row and thereby increasing the offset between the rollers of one row and those of the second row, with resultant lateral displacement of the rollers of said one row into clamping relationship with said blade and said side wall abutment area, while the rollers of the second row exert a counterforce upon the second side wall of the said channel.

6. The combination as defined by claim 5, wherein said means for applying force to an endmost roller, includes a single clamp actuator to which the roller are responsive.

7. The combination as defined by claim 6, wherein the single clamp actuator includes a single clamp screw located upon the cylinder blade intermediate the ends thereof.

8. The combination as defined by claim 5, wherein rotation and shifting of said rollers is effected both longitudinally and transversely of the blade axis by said single clamp actuator.

9. The combination as defined by claim 5, wherein is included means for normally retaining the rollers against displacement from the channel.

10. The combination as defined by claim 5, wherein is included means for normally retaining said rollers against displacement from the channel.

11. The combination of an elongate axially rotatable blade cylinder for detachably supporting an elongate substantially flat blade lengthwise of the cylinder axis, said cylinder having an elongate channel formed in the periphery thereof between opposite ends thereof, said channel having a bottom wall, and opposite side walls arranged in spaced parallelism with one another, one of said side walls providing an abutment for a flat face of said blade; a multiplicity of rollers disposed within said channel, with the axes of the rollers parallel to one another and disposed substantially radially of the periphery of the blade cylinder, said rollers being arranged in two parallel rows, with the rollers of one row being in peripheral line contact with the rollers of the second row, and the rollers of said one row being located between and offset from the rollers of the second row; stop means for limiting the extent to which the rollers may move outwardly toward the opposite ends of the said channel; and means for applying force to a roller of a row in a direction lengthwise of the channel axis, for rotating and cramping the rollers of one row against the rollers of the second row for increasing the offset of the rollers of said one row relative to those of the second row, with resultant lateral displacement of the rollers of said one row into clamping relationship with said blade and the abutment aforesaid, while the rollers of the second row exert a counterforce upon the remaining side wall of said channel, said line contact of said rollers accurately and uniformly clamping the blade in locked, operative position in said channel.

12. The combination as defined by claim 11, wherein said means for applying force to an endmost roller includes a single actuator to which the rollers are responsive.

13. The combination as defined by claim 12, wherein the single actuator includes a single clamp screw located upon the blade cylinder intermediate the ends thereof.

14. The combination as defined by claim 12, wherein the means last mentioned includes a pair of oppositely expandable movable blocks each operative for applying force to an endmost roller of a row, in the direction of a limiting stop means aforesaid, said movable blocks being located intermediate the ends of said channel.

15. The combination as defined by claim 14, wherein the single actuator includes a single clamp screw located upon the blade cylinder.

16. The combination as defined by claim 11, wherein is included means for retaining the roller within the channel irrespective of any clamped relationship of the blade therein.

17. The combination as defined by claim 11, wherein said means for applying force to an endmost roller of a row includes: a double-faced floating wedge member advanceable transversely within the channel intermediate the ends thereof, with each face of the wedge member acting against an endmost roller to displace the rollers at opposite faces of the wedge member and in opposite directions therefrom; and an actuator for imparting said transverse movement to said wedge member.

18. The combination as defined by claim 17, wherein the means last mentioned includes means for imposing a positive force of retraction upon the wedge member.

19. The combination as defined by claim 17, wherein the means last mentioned includes a single actuator for moving the wedge member.

20. The combination as defined by claim 17, wherein is included another double-faced wedge member active to displace rollers in opposite directions therefrom within the same channel.

21. The combination as defined by claim 11, wherein said means for applying force to an endmost roller of a row, is located at an end of the blade cylinder.

22. The combination as defined by claim 11, wherein the means last mentioned comprises an adjustable actuator screw located at an end of the blade cylinder.

23. The combination as defined by claim 22, wherein the adjustable actuator screw is supported by a stationary abutment member substantially closing one end of the channel, and having a threaded bore therein accommodating said screw for movement lengthwise of the channel.

24. The combination as defined by claim 22, wherein said actuator screw forms an end closure for the channel.

25. The combination as defined by claim 17, wherein is included a carrier supporting said wedge member and said actuator, said carrier including a mounting stud; and means comprising a hole drilled in the material of the blade cylinder, for receiving and supporting said mounting stud.

26. The combination as defined by claim 17, wherein is included a carrier supporting said wedge member and said actuator; and means for mounting said carrier upon the blade cylinder intermediate the ends thereof.

27. The combination as defined by claim 25, wherein is provided a second hole drilled in the material of the blade cylinder adjacent to the hole first mentioned, to enhance accessibility of the actuator for manipulation in moving the wedge member.

28. The combination as defined by claim 27, wherein the actuator is adapted for imposing a positive force of retraction upon the wedge member.

29. The combination as defined by claim 17, wherein the faces of the wedge member are inclined at least 10° from the axis of the row of rollers.

30. The combination as defined by claim 28, wherein the faces of the wedge member meet one another at between 156° and 160° angularity.

31. The method of locking an elongate flat blade against one of two opposite side walls of a channel formed in the peripheral face of a blade cylinder, said method comprising the steps of: confining within the channel a multiplicity of rolling elements in light rolling contact with one another, with successive ones of said elements offset relatively to provide two rows of rolling elements parallel to the channel side walls, one row of rolling elements being adjacent to one channel side wall, and the second row being adjacent to a flat face of said blade; and compacting said rolling elements within the channel while limiting expansion of said rows lengthwise of the channel, to enforce an increase of offset of the rolling elements relatively, and laterally of the channel, for imposing a force against the blade and an adjacent channel side wall, and a counterforce against the remaining channel side wall, to lock the blade within the channel.

32. The method as defined by claim 31, wherein said rolling elements are in the form of hardened rollers supported within the channel with their axes parallel to one another.

33. The method as defined by claim 32, wherein the axes of the rollers are disposed substantially at right angles to the axis of the cylinder blade, and the rollers are rotated and forced into blade-locking position by introducing a wedge between two adjacent rollers for displacing the wedged rollers in opposite directions within the channel.

34. The method as defined by claim 31, wherein the compacting force is applied at one end of the channel.

35. An elongate, axially rotatable cylinder having an elongate, axially extending channel in an outer surface portion thereof extending substantially the length of the cylinder, said channel having spaced apart, parallel side walls and a bottom, an elongate, substantially flat cutting blade in the channel extending substantially throughout the length thereof and having opposite, substantially flat side surfaces, with one of said side surfaces in engagement with one of said channel side walls, said blade having a cutting edge projecting radially outwardly from the channel, retaining means in the channel retaining the cutting blade in the channel, said retaining means including two parallel rows of substantially identical blade locking rollers in the channel with the axes of the rollers parallel to one another and extending substantially radially of the cylinder, the rollers of each row aligned with one another, and adjacent rollers in each row spaced apart at their peripheries a distance less than the diameters of the rollers, with the rollers of each row projecting partially into the space between adjacent rollers of the other row and in line contacting engagement therewith, fixed means in the opposite ends of the channel engaged with endmost rollers in said rows of rollers to prevent displacement of said rollers outwardly beyond the ends of the channel, and actuating means extending into the channel into engagement with at least one roller in one of said rows to urge the roller in a direction longitudinally of the channel to thus cause the rollers through engagement with one another to move laterally of the channel toward the side walls thereof and exert a force on said blade at substantially a right angle to the other side surface thereof to wedge the blade against said one channel side wall to lock the blade in the channel.

36. An elongate cylinder as in claim 35, wherein said retaining means includes a pair of spaced, parallel retainer strips in said channel along opposite sides of said rows of rollers and in engagement with the rollers of a respective, adjacent row, one of said strips in flatwise contact with the other side surface of said blade, and the other strip in flatwise contact with the other channel side wall.

37. An elongate cylinder as in claim 36, wherein each roller has an annular groove therearound intermediate its ends, and an elongate rib is on the side of each strip adjacent the rollers, said rib engaged in said grooves to retain the rollers against displacement radially outwardly from said channel.

38. An elongate cylinder as in claim 35, wherein said blade and said strips are normally spaced from the bottom of said channel to enable adjustment of said blade radially of said cylinder.

* * * * *